United States Patent
Smuk et al.

(10) Patent No.: US 6,806,590 B1
(45) Date of Patent: Oct. 19, 2004

(54) DATA BUS FOR A PLURALITY OF NODES

(75) Inventors: Karel Smuk, Schweitenkirchen (DE); Robert Griessbach, Wayarn (DE); Martin Peller, Munich (DE); Josef Berwanger, Poing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/623,894
(22) PCT Filed: Feb. 23, 1999
(86) PCT No.: PCT/EP99/01165
§ 371 (c)(1), (2), (4) Date: Nov. 21, 2000
(87) PCT Pub. No.: WO99/46894
PCT Pub. Date: Sep. 16, 1999

(30) Foreign Application Priority Data

Mar. 10, 1998 (DE) .......................... 198 10 291

(51) Int. Cl.$^7$ .............................. H01H 85/46
(52) U.S. Cl. ........................ 307/115; 370/216; 398/1
(58) Field of Search ................... 307/9.1, 10.1, 307/115; 370/216; 398/1

(56) References Cited

U.S. PATENT DOCUMENTS 5,953,143 A * 9/1999 Sharony et al. ............... 398/46

* cited by examiner

Primary Examiner—Robert DeBeradinis
(74) Attorney, Agent, or Firm—Crowell & Moring LLP

(57) ABSTRACT

A data bus arrangement for a plurality of nodes connected to each other including a logical decision gate having a plurality of inputs corresponding to the number of nodes. A converter module is connected between each node and the logical decision gate. Each convertor module converts an optical output from one of the nodes to an electrical signal which is fed to one of the inputs of the logical decision gate. A separate switch is connected between an output of the logical decision gate and an input of each one of said convertor modules for controlling the convertor module independent of an output signal on the output of the decision gate.

3 Claims, 1 Drawing Sheet

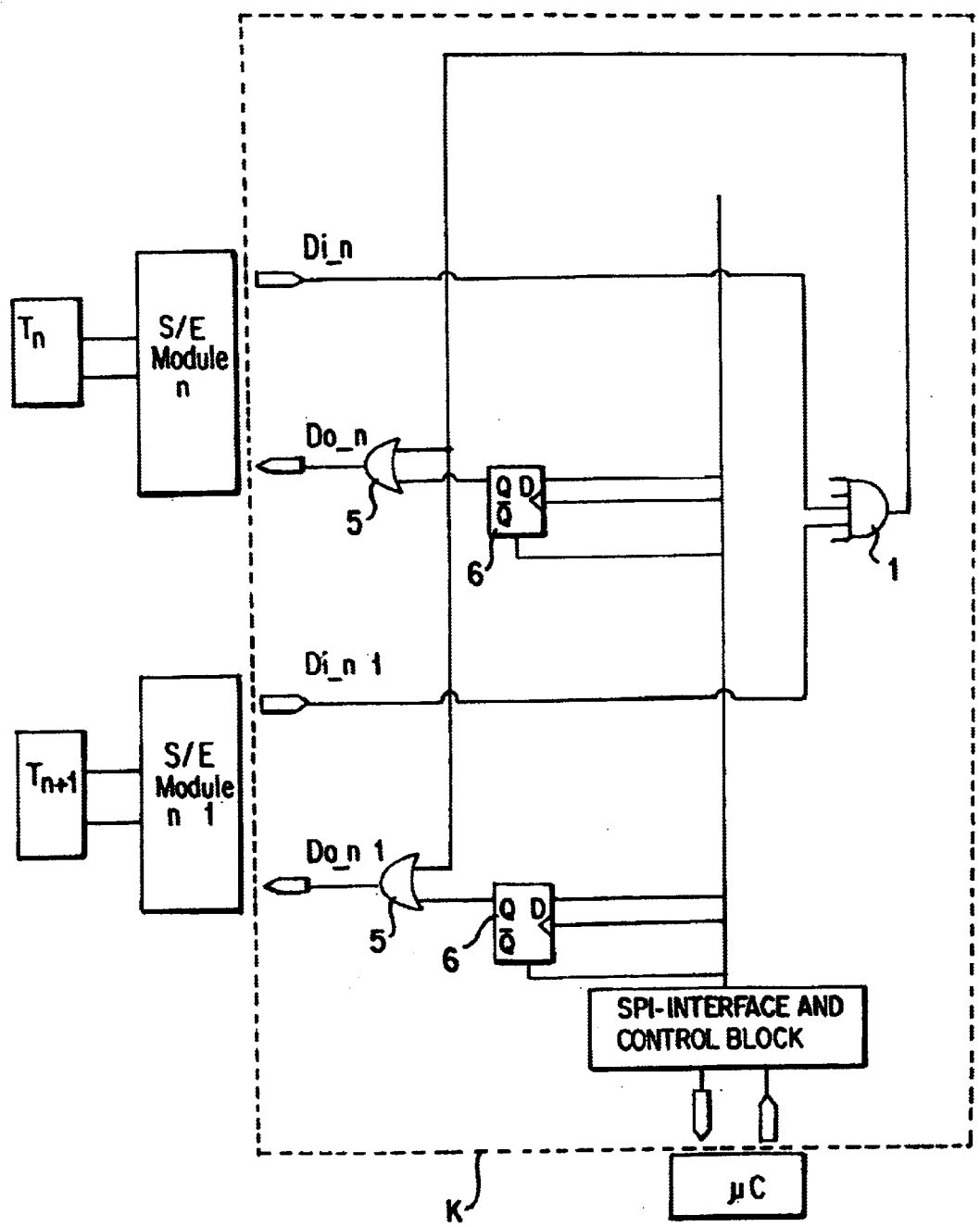

DATA BUS FOR A PLURALITY OF NODES

This application claims the priority of German Patent Application 198 10 291.7, filed Mar. 10, 1998 and PCT/EP99/01165 filed Oct. 3, 1998, the disclosures of which are expressly incorporated by reference herein.

The invention relates to a data bus for a plurality of nodes that are connected to one another via a star coupler. Such a data bus is known from the unpublished German patent application 19720401. Herein, the nodes are connected to the data bus via transmitter/sender modules as long as nodes are operating properly bus nodes are active even when they are not required. Depending on the type of application, however, deactivation of the entire data bus may not always be desirable. After a vehicle is turned off, nodes serving the access control and antitheft protection systems should remain active even though all the rest of the nodes are not required.

The object of the invention is to provide a data bus of the aforementioned type that allows nodes to be selectively disconnected.

According to the present invention, a series of individual measures in combination provide the desired effect. In one of such measures, optionally occurring optical signals are converted to electrical signals and fed as input signals to the star coupler arrangement. The star coupler arrangement itself includes a logical decision gate to which input signals are fed, whose. output is connected to the inputs of the nodes in a parallel manner via an electrical line. A switch is arranged in parallel at least at the inputs of the nodes, Which are disconnected when required. The switch can optionally be activated, and interrupts the transmission segment between said decision gate and said node, thus disconnecting said node from the data bus.

In an advantageous development of the invention the addressability of the switch enables only a single node to be disconnected from the data bus, if required, in a simple manner.

Finally, such a switch can be assigned to a group of nodes, which can always be connected or disconnected as a unit.

Other objects, advantages and novel features of the present invention will become apparent from the following detailed description of the invention when considered in conjunction with the accompanying drawings.

BRIEF DESCRIPTION OF THE DRAWINGS

The single FIGURE shows a detail representation of a data bus according to the invention whereby the mode of transmission of the nodes is monitored.

DETAILED DESCRIPTION OF THE DRAWINGS

At a data bus D are represented two nodes $T_n$ and $T_{n+1}$ that are connected via S/E (transmit/receive) modules $S/E_n$ and $S/E_{n+1}$. The $S/E_n$ and $S/E_{n+1}$ modules convert optical messages in electric form received from the $T_n$ and $T_{n+1}$ nodes and relay these signals $Di_n$, $Di_{n+1}$ as input signals to a logical decision gate (AND Gate 1) as the central component of a star coupler K. The number of inputs and outputs of AND Gate 1 corresponds to the number of bus nodes. The output of AND Gate 1 drives all inputs ($Do_n$, $Do_{n+1}$) of the $S/E_n$ and $S/E_{n+1}$ modules. The modules convert these electrical signals into optical signals and transmit same to $T_n$ and $T_{n+1}$ nodes via optical transmission segments.

A node can be disconnected from receiving bus communication. To this end, in each output path of the AND Gate 1 is provided an OR Gate 5 whose second input can be set to the high level via an output of a control register 6. The control register 6 is addressable and is controlled by a serial interface (SPI, for example) of a microcontroller $\mu C$.

Thus, a low level can no longer proceed from the output of the AND Gate 1 to the input of the assigned $S/E_n$ or $S/E_{n+1}$ modules. The connected node cannot receive messages, and can remain in sleep mode, for example. With this function, nodes can be disconnected from the bus communication, either individually or in groups.

When the node is reactivated, the control register 6 can be deactivated and the OR Gate 5 can once again be made conductive for a low level.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data bus arrangement for a plurality of nodes connected to each other, said arrangement comprising:

a logical decision gate having a plurality of inputs corresponding to said plurality of nodes;

at least one converter module connected between said plurality of nodes and said logical decision gate, each convertor module converting an optical output from one of said nodes to an electrical signal which is fed to one of said inputs of said logical decision gate;

a plurality of switching means, each switching means connected between an output of said logical decision gate and an input of one of said convertor modules for controlling said convertor module independent of an output signal on the output of said decision gate.

2. The data bus arrangement according to claim 1, wherein said switch means includes a control register addressable from a micro controller; and an OR gate having a first input for receiving the output of said decision gate and the second input for receiving an output of said control register.

3. A method for controlling communication among a plurality of data nodes, comprising the steps of:

providing a decision gate having a plurality of inputs corresponding to said plurality of nodes;

providing at least one convertor module connected between said plurality of nodes and said logical decision gate, each convertor module converting an optical out from one of said nodes to an electrical signal which is fed to one of said inputs of said logical decision gate;

outputting a signal from said logical decision gate to an input of each of said convertor modules;

providing a plurality of switchable control means, each of said plurality of switchable control means connected to one of said convertor modules for controlling said convertor module independent of an output signal on the output of said decision gate.

* * * * *